Dec. 16, 1941.    C. R. McCULLOUGH    2,266,328
PRODUCTION OF PHOSPHATES
Filed July 1, 1939        2 Sheets-Sheet 1
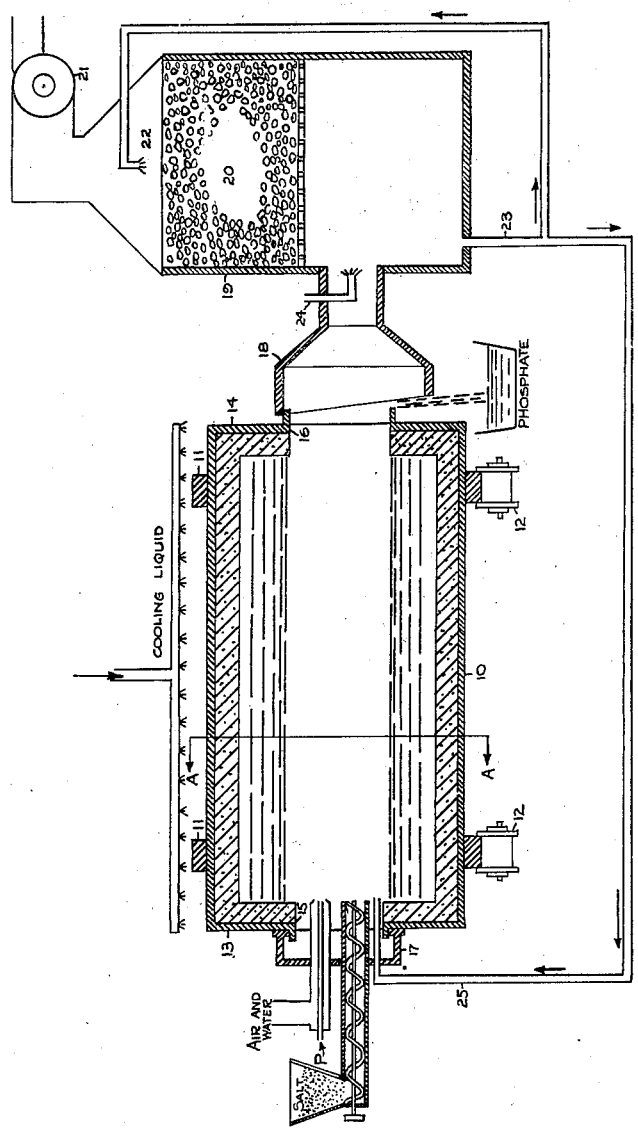
FIGURE I
INVENTOR
C. R. McCULLOUGH
BY
Herbert Chase.
ATTORNEY Dec. 16, 1941.   C. R. McCULLOUGH   2,266,328
PRODUCTION OF PHOSPHATES
Filed July 1, 1939   2 Sheets—Sheet 2
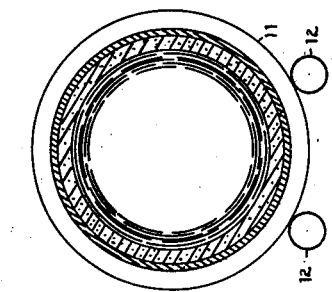
FIGURE V
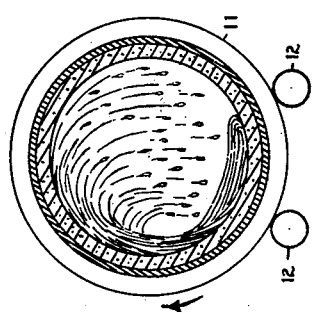
FIGURE IV
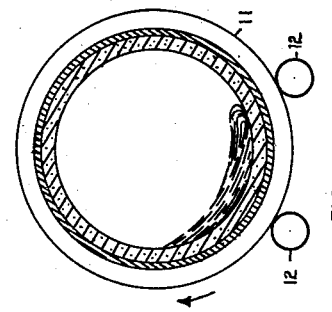
FIGURE III
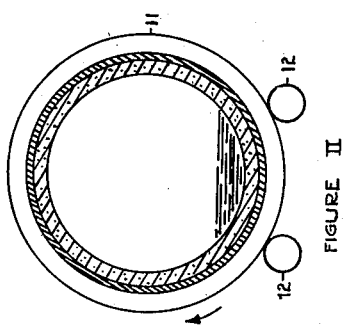
FIGURE II
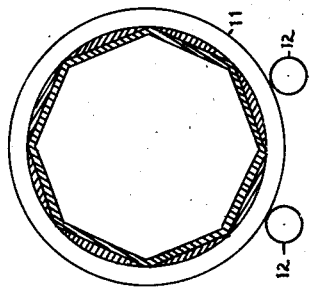
FIGURE VIII
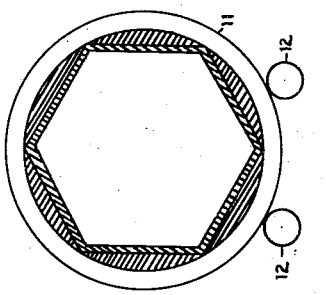
FIGURE VII
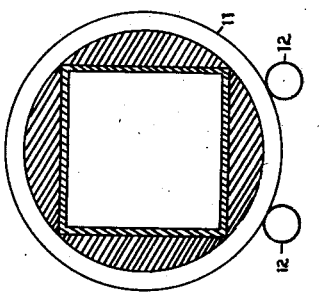
FIGURE VI
INVENTOR
C. R. McCULLOUGH.
BY
*Hubert Chase*
ATTORNEY Patented Dec. 16, 1941

2,266,328

UNITED STATES PATENT OFFICE 2,266,328

PRODUCTION OF PHOSPHATES

Campbell R. McCullough, Anniston, Ala., assignor to Monsanto Chemical Company, a corporation of Delaware Application July 1, 1939, Serial No. 282,634

5 Claims. (Cl. 23—106)

The present invention relates to a method for the production of phosphates by processes in which phosphorus is oxidized and the oxidation products thereof are combined with compounds including salts having a replaceable anion. According to the present invention I may produce either acid, neutral, or basic salts of phosphoric acid.

An object of the present invention is to provide a method and apparatus by which the heat generated by the combustion of phosphorus is first efficiently utilized for the production of salts of phosphorus.

A further object of this invention is the provision of a method and apparatus by which the heat absorbing surfaces of phosphorus-burning chambers may be greatly augmented.

My invention will be described by reference to the drawings illustrating methods and apparatus by which my invention may be practiced.

In the drawings Figure I shows a rotary burning chamber 10 rotatably mounted upon tires 11 and rollers 12.

The rotary burning chamber 10 is equipped with end plates 13 and 14, each provided with central openings 15 and 16. Admission and outlet headers 17 and 18 are provided adjacent the openings 15 and 16. Outlet header 18 connects with mist filter 19, in which is supported a layer of fine coke or other packing material 20 suitable for filtering out phosphoric acid mist. Suction is applied to the mist filter 19 by means of fan 21. A supply of water 22 may be applied to the top of the filter bed 20, serving to dilute the acid collected upon the filtering surfaces. In place of water, a dilute solution of phosphate of soda or other alkali may be introduced by means of 22. Acid or sodium phosphate solution collected in filter 19 flows out by means of pipe 23 and may either be used as collected or may be returned to the rotary furnace by pipe 25, as indicated on the drawings.

In operation molten yellow phosphorus and air are introduced into one end of the furnace, for example, by means of header 17 located adjacent opening 15. Water vapor or steam may also be introduced together with the air used for combustion.

A supply of salt may be introduced through an opening in header 17, said salt being conveniently conveyed and projected into the interior of the furnace 10 by means of a screw conveyor or an air blast. With the arrangement shown the air and phosphorus, or the combustion products thereof, are made to flow through furnace 10 concurrently. By suitable change, countercurrent operation may be practiced. Discharge of molten salt generated within furnace 10 is effected through a discharge header 18 provided adjacent opening 16.

During operation of the process combustion of yellow phosphorus takes place within furnace 10, which is maintained at a suitable speed of rotation, and the combustion products react with the solid salt which is simultaneously fed into the furnace, causing the volatile anion thereof to be displaced and forming a molten phosphorus salt. When required for the reaction, steam or water may be introduced, either separately or together with the air provided for maintaining combustion of phosphorus.

During operation the temperature within furnace 10 reaches an incandescent temperature by combustion of the phosphorus with the air introduced, and the oxidation products react with salt to produce molten phosphorus compounds which normally collect in a pool at the lower part of the furnace. By virtue of the rotation of the furnace the molten salt is carried upwardly upon the interior surfaces of the said furnace. Cooling fluid is applied to the exterior of the shell of furnace 10, said fluid being applied in quantities so as to mantain adjacent the interior of said metal shell a layer of solid phosphorus-containing salts. By virtue of the solid layer of salt maintained upon the interior surfaces of the said furnace, corrosion of the metal furnace is completely prevented from taking place.

When rotating the furnace at relatively slow speeds the pool of molten phosphorus salts is maintained substantially at the lower part of the furnace and only a small amount of molten salt is carried upwardly by the moving walls of the furnace. At increasingly higher speeds of rotation a greater amount is thus carried upwardly within the furnace, and I may so increase the speed of rotation of the furnace that the normal pool at the lower part of the furnace will completely disappear because all of the molten salt has been carried upwardly and maintained against said furnace walls by centrifugal force. The latter condition has been designated as a centrifugally maintained liquid lining.

Prior to the development of the last-named centrifugal lining, however, I have found that within certain critical rotational speeds I obtain a phenomenon in which the molten salt leaves the wall of the furnace before the highest point is reached and falls downwardly through the furnace interior. This condition I have designated as "rain," because of the fact that the atmosphere within the furnace is filled with droplets and streams of molten salt. When this condition exists an enormously greater surface of molten salt is presented to the gases and vapors within the furnace atmosphere. This greatly increased surface materially increases the absorption of heat and also phosphorus oxidation and hydration products thereof by the molten salts. As an example, I have found that the absorption of phosphorus anhydride may be increased from, say, 50–60% of the phosphorus burned when using ordinary slow-speed rotational velocities of the furnace, to as much as 90–95 per cent when using the "rain" condition of operation. The absorption of heat by the molten salt is also increased.

The effect above described is shown graphically in Figures II to V inclusive of the drawings which are taken along section A—A of Figure I.

Figure II shows the condition resulting from what I term slow-speed operation, and indicates that a fairly quiet pool of molten salt remains within the furnace with a substantially horizontal surface.

Figure III shows conditions obtaining in the furnace at a somewhat faster speed of turning, and indicates that the pool of molten solt is being carried upwardly by the rising furnace wall so that the level of the pool is no longer horizontal.

Figure IV shows conditions existing in the furnace at a still higher speed of revolution than that shown in Figure III. In this condition the molten salt within the furnace leaves the wall before the highest point is reached and thereafter falls freely downwardly through the furnace atmosphere. This is the condition which I designate as "rain," because the atmosphere within the furnace is filled with very many droplets and streams of molten salt.

Figure V shows the condition existing in the furnace at a still higher speed than that illustrated in Figure IV. Under the conditions illustrated by Figure V the furnace is turning at what has been designated as high-speed or centrifugal speed. Under this condition the molten salt is maintained as a continuous liquid film or layer upon the interior of the furnace wall, and the atmosphere within the furnace is relatively free of the droplets and streams of salt illustrated by Figure IV.

Since the conditions illustrated by the drawings, Figures II to V inclusive, are dependent upon the diameter of the furnace and the viscosity of the molten salt, which viscosity is further dependent upon the character and temperature of said salt, it is impossible to numerically state the speed at which the various phenomena occur. However, the conditions illustrated follow each other in the order stated when the drum or furnace speed is gradually increased, so that it is a simple matter to find the critical speed to give the condition for maximum absorption in said furnace.

While it is possible to obtain the condition described as "rain" in a cylindrical drum or furnace, a more satisfactory method of producing the condition of "rain" is to provide a non-cylindrical drum, that is, one which has a square, pentagonal, hexagonal or octagonal cross section. Figures VI to VIII inclusive illustrate various non-cylindrical drum cross-sections suitable for my purpose. It is also possible to obtain the condition of "rain" by providing the interior surface of the drum with blocks or projections fastened thereto. In such cases the solid and the liquid layer of salt adjacent the interior of the furnace wall assumes roughly the configuration of said wall, providing the optimum condition for production of "rain."

In my co-pending application, Serial No. 255,574, which was filed Feb. 10, 1939, which application describes and claims a method and apparatus for producing acids of phosphorus, I have described and illustrated various types of furnaces for obtaining the effect described.

By means of the herein disclosed process I am able to produce the various metal phosphates, such as sodium metaphosphate, tetrasodium pyrophosphate, and the various polyphosphates. By the use of superheated or oxygen enriched air I may produce trisodium phosphate or other salts having a high melting point. I may also produce the corresponding potassium salts. It is also contemplated that the production of other metallic phosphates, such as phosphates of calcium, aluminum, magnesium, lead and zinc, may be produced by the herein described process. Addition compounds of phosphorus, such as calcium metaphosphate may be made by reaction of tricalcium phosphate or phosphate rock with oxidation products of phosphorus. The raw materials which are supplied in solid or liquid form to the furnace may be determined by the product which is to be made. For example, I may feed to said furnace sodium chloride, sodium carbonate, sodium hydroxide, potassium chloride, carbonate, or hydroxide or, when producing calcium phosphates, I may feed the various calcium salts, such as calcium chloride, sulfate, phosphate, etc.

When operating under the conditions described, I may obtain an absorption of from 85% to 95% of the phosphorus burned directly in the molten salt within the furnace. I accordingly so proportion the amount of phosphorus burned and the salt fed to give the product of composition desired. Several examples will serve to illustrate my inventions:

*Example 1.—Production of tetra sodium pyrophosphate*

In a furnace having a metal shell 6 feet long and 24 inches in diameter, externally cooled and revolving at 210 R. P. M., at which speed I obtain the "rain" phenomenon mentioned above, I feed 100 pounds of phosphorus an hour, 156 cu. ft. of air a minute, and 308 pounds of soda ash an hour. I obtain an estimated exit gas temperature within said furnace of 1100–1200° C. which is well above the melting point of tetrasodium pyrophosphate (980° C.) and therefrom discharge a product at the rate of 386 pounds an hour. The absorption obtained is 90% of the phosphorus burned. The product will ordinarily analyze as follows:

Per cent $P_2O_5$=53.2
Per cent $Na_2O$=46.6

A product of this analysis is better than 99% $Na_4P_2O_7$.

The product leaving the furnace, in a molten state, may be cooled by a chilling device, or may be cooled and disintegrated by a blast of air or steam to give a finely divided product.

The phosphorus pentoxide-containing gases (containing the $P_2O_5$ unabsorbed in the furnace) pass out of said furnace and are cooled by spraying them directly with water of dilute sodium phosphate or soda ash solution introduced at 24 of Figure I. Additional water, phosphate solution or soda ash solution is introduced upon the filter medium 20 to cool and absorb the pentoxide in the gases entering filter chamber 19. The phosphorus pentoxide removed from the gases by the filter is thus obtained dissolved in a solution, either as phosphoric acid or as a sodium phosphate. It may then be returned to the furnace by means of pipe 25, as shown on Figure I.

EXAMPLE 2.—*Production of sodium hexa-metaphosphate*

In the same furnace described in Example I, I feed phosphorus at the rate of 100 pounds an hour, soda ash at the rate of 144 pounds an hour, and withdraw sodium metaphosphate at the discharge of the furnace at the rate of 280 pounds an hour. The absorption obtained is 85% of the phosphorus burned. Since the process yields directly a molten metaphosphate at the discharge of the furnace, I then quickly cool the molten product by allowing it to fall directly upon a chilled plate or upon chill rolls to produce flakes, or the product may be cooled and disintegrated by a blast of air. By thus quickly cooling the molten product I am enabled to produce what is commonly referred to as the hexa-metaphosphate of sodium.

EXAMPLE 3.—*Production of alkali metal polyphosphates*

When it is desired to produce any of the various polyphosphates of the alkali metals by my process, I adjust the supply of alkali metal salt and the phosphorus absorbed to produce the desired stoichiometric composition. The production of the various sodium polyphosphates, for example, will take place according to the following equations:

(a) Sodium triphosphate
$$5Na_2CO_3+6P+7\tfrac{1}{2}O_2=2Na_5P_3O_{10}+5CO_2$$

(b) Sodium tetraphosphate
$$3Na_2CO_3+4P+5O_2=Na_6P_4O_{13}+3CO_2$$

(c) Sodium decaphosphate
$$6Na_2CO_3+10P+12\tfrac{1}{2}O_2=Na_{12}P_{10}O_{31}+6CO_2$$

(d) Sodium hexerohexaphosphate
$$4Na_2CO_3+6P+7\tfrac{1}{2}O_2=Na_8P_6O_{19}+4CO_2$$

I am enabled by my process to produce the above mentioned polyphosphates or compositions approximating these polyphosphates by a simple, direct process without the intermediate production of other phosphates. The above process contemplates the use of air as the oxidizing medium; however, oxygen-enriched air or other oxygen-containing gases may be used.

I may use generally for the production of the sodium phosphates, sodium salts or compounds which may be considered as combinations of $Na_2O$ or Na and a replaceable or volatile anion, that is, said anion being replaceable or volatile at the temperature of the reaction. The temperature of the reaction should be maintained above the melting point of the phosphate, or polyphosphate, produced.

What I claim is:

1. A method for producing a salt of phosphorus which comprises providing a layer of said salt of phosphorus upon the interior of the metal shell of an exteriorly cooled rotating furnace, establishing an incandescent temperature within said furnace by supplying thereto hot products of combustion of phosphorus, supplying to said furnace a metal compound reactive with said products of combustion, to produce therewith a molten phosphorus containing salt and rotating said furnace at a rate such that the said molten salt leaves the furnace wall before the highest point thereof is reached and falls down through the furnace atmosphere as droplets and streams of said salt, whereby the absorption of phosphorus combustion products by said salt is materially increased, said rate of rotation being less than that required to maintain a centrifugal lining of said salt.

2. A method for producing tretasodium pyrophosphate which comprises providing a layer of said pyrophosphate upon the interior of the metal shell of an exteriorly cooled rotating furnace, establishing an incandescent temperature within said furnace by supplying thereto hot products of combustion of phosphorus, supplying to said furnace soda ash to produce said tetrasodium pyrophosphate in the molten state, rotating said furnace at a rate such that said molten pyrophosphate leaves the furnace wall before the highest point is reached, and falls down through the furnace atmosphere as droplets and streams of said molten salt, whereby the absorption of said phosphorus combustion products by said salt is increased to as much as 90% to 95%, said rate of rotation being less than that required to maintain a centrifugal lining of said salt.

3. A method for producing sodium metaphosphate, which comprises providing a layer of said phosphate upon the interior of the metal shell of an exteriorly cooled rotating furnace, establishing an incandescent temperature within said furnace by supplying thereto hot phosphorus combustion products, supplying to said furnace a sodium salt having a replaceable anion to produce said metaphosphate in the molten state, and rotating said furnace at a rate such that said molten metaphosphate leaves the furnace wall before the highest point is reached and falls down through the furnace atmosphere as droplets and streams of molten salt, whereby the absorbing surface of the molten salt is increased to the extent that up to 90% to 95% of said phosphorus combustion products are absorbed by said molten salt, said rate of rotation being less than that required to maintain said molten salt as a centrifugal lining upon said furnace interior.

4. A method for producing a sodium polyphosphate compound which comprises providing a layer of said compound upon the interior of the metal shell of an exteriorly cooled rotating furnace, establishing an incandescent temperature within said furnace by supplying to said furnace hot phosphorus combustion products, supplying to said furnace a sodium salt having a replaceable anion to produce said polyphosphate in the molten state and rotating said furnace at a rate less than that required to maintain said molten polyphosphate as a centrifugal lining, but said rate being such that said molten polyphosphate leaves the furnace wall before the highest point encountered during rotation is reached and falls down through the furnace atmosphere as droplets and streams of molten salt, whereby the absorbing surface of the molten salt is increased to the extent that up to 90% to 95% of said phosphorus combustion products are absorbed in said molten polyphosphate.

5. A method for producing a sodium tripolyphosphate compound which comprises providing a layer of said compound upon the interior of the metal shell of an exteriorly cooled rotating furnace, establishing an incandescent temperature within said furnace by supplying to said furnace hot phosphorus combustion products, supplying to said furnace a sodium salt having a replaceable anion to produce said tripolyphosphate in the molten state and rotating said furnace at a rate less than that required to maintain said molten polyphosphate as a centrifugal lining, but said rate being such that said molten polyphosphate leaves the furnace wall before the highest point encountered during rotation is reached and falls down through the furnace atmosphere as droplets and streams of molten salt, whereby the absorbing surface of the molten salt is increased to the extent that up to 90% to 95% of said phosphorus combustion products are absorbed in said molten polyphosphate.

CAMPBELL R. McCULLOUGH.